United States Patent [19]

Herzig et al.

[11] Patent Number: 5,241,034
[45] Date of Patent: Aug. 31, 1993

[54] SILOXANE COPOLYMERS CONTAINING ALKENYL GROUPS, THEIR PREPARATION AND USE

[75] Inventors: Christian Herzig, Taching am See; Bernward Deubzer, Burghausen, both of Fed. Rep. of Germany; David Huettner, Tecumseh, Mich.

[73] Assignee: Wacker-Chemie GmbH, Munich, Fed. Rep. of Germany

[21] Appl. No.: 913,089

[22] Filed: Jul. 14, 1992

[30] Foreign Application Priority Data

Jul. 15, 1991 [DE] Fed. Rep. of Germany ....... 4123423

[51] Int. Cl.$^5$ ............................................. C08G 77/06
[52] U.S. Cl. ....................................... 528/15; 528/32; 556/467; 556/478; 556/479
[58] Field of Search ..................... 528/15, 32; 556/467, 556/478, 479

[56] References Cited

U.S. PATENT DOCUMENTS

| | | | |
|---|---|---|---|
| 4,741,966 | 5/1988 | Cavezzan | 528/32 |
| 4,886,865 | 12/1989 | Ikeno et al. | 528/15 |

FOREIGN PATENT DOCUMENTS

| | | |
|---|---|---|
| 0414938 | 8/1989 | European Pat. Off. |
| 0439777 | 12/1990 | European Pat. Off. |
| 0439778 | 12/1990 | European Pat. Off. |

Primary Examiner—Melvyn I. Marquis

[57] ABSTRACT

Siloxane copolymers containing alkenyl groups are prepared by reacting an organic compound (1) containing at least two aliphatic double bonds of the general formula $$R^2(CR^3=CH^2)_x$$

in which $R^2$ is a divalent, trivalent or tetravalent hydrocarbon radical having from 1 to 25 carbon atoms per radical, $R^3$ is a hydrogen atom or an alkyl radical having from 1 to 6 carbon atoms per radical and x is 2, 3 or 4, with an organopolysiloxane (2) having an average of more than one Si-bonded hydrogen atom per molecule, in the presence of a catalyst (3) which promotes the addition of Si-bonded hydrogen to an aliphatic double bond, in which the ratio between the aliphatic double bond in the organic compound (1) and the Si-bonded hydrogen in the organopolysiloxane (2) is such that the alkenyl containing siloxane copolymers thus obtained have an average of more than one alkenyl group per molecule of the formula —$CR^3=CH^2$, in which $R^3$ is the same as above.

11 Claims, No Drawings

SILOXANE COPOLYMERS CONTAINING ALKENYL GROUPS, THEIR PREPARATION AND USE

The present invention relates to siloxane copolymers containing alkenyl groups and to a process for their preparation. The invention further relates to crosslinkable compositions comprising a siloxane copolymer containing alkenyl groups, an organopolysiloxane containing Si-bonded hydrogen atoms and a catalyst, and to the use of these compositions in the production of non-stick coatings.

BACKGROUND OF THE INVENTION

Crosslinkable compositions which comprise an organopolysiloxane containing Si-bonded vinyl groups, an organopolysiloxane containing Si-bonded hydrogen atoms and a catalyst which promotes addition of Si-bonded hydrogen onto an aliphatic double bond, are known from U.S. Pat. No. 3,445,420, published May 20, 1969, (G. J. Kookootsedes et al., Dow Corning Corp.) and GB-A 1,374,792, published Nov. 20, 1974, (J. A. Colquhoun et al., Dow Corning Ltd.).

U.S. Pat. No. 4,347,346, published Aug. 31, 1982, and U.S. Pat. No. 4,476,166, published Oct. 9, 1984, (R. P. Eckberg, General Electric Co.) and U.S. Pat. No. 4,504,645, published Mar. 12, 1985, (K. C. Melancon, Minnesota Mining and Manufacturing Co.) disclose that in addition to an organopolysiloxane having Si-bonded vinyl groups, an organopolysiloxane having other alkenyl groups, such as Si-bonded allyl, butenyl or pentenyl groups, may be used in crosslinkable compositions for the production of non-stick coatings.

Crosslinkable compositions which are used for the production of non-stick coatings and comprise an organopolysiloxane containing higher alkenyl groups, such as Si-bonded hexenyl groups, are known from U.S. Pat. No. 4,609,574, published Sep. 2, 1986 (J. R. Keryk et al., Dow Corning Corp.). The organopolysiloxanes containing higher alkenyl groups are usually prepared in a multi-stage process from the corresponding silanes by reacting an $\alpha,\Omega$-diene in a large excess with a silane having an Si-bonded hydrogen atom and thereafter hydrolyzing and equilibrating these silanes with organopolysiloxanes.

Therefore, it is an object of the present invention to provide siloxane copolymers which contain alkenyl groups. Another object of this invention is to prepare siloxane copolymers containing alkenyl groups in a simple process. Another object of the present invention is to provide a process for preparing siloxane copolymers in which more than one alkenyl group is added to one Si atom. Still another object of the present invention is to prepare siloxane copolymers which crosslink rapidly with organopolysiloxanes containing Si-bonded hydrogen atoms in the presence of a catalyst which promotes the addition of Si-bonded hydrogen onto an aliphatic double bond. Furthermore, it is an object of the present invention to provide crosslinkable compositions which may be used in the production of non-stick coatings.

SUMMARY OF THE INVENTION

The foregoing objects and others which will become apparent from the following description are accomplished in accordance with this invention, generally speaking, by providing siloxane copolymers containing alkenyl groups, comprising (a) siloxane units of the formula

in which R is the same or different, and represents hydrocarbon radicals having from 1 to 18 carbon atoms per radical or halogenated hydrocarbon radicals having from 1 to 18 carbon atoms per radical, $R^1$ is the same or different alkyl radicals having from 1 to 4 carbon atoms per radical, which can be substituted by an ether oxygen atom, a is 0, 1, 2 or 3, b is 0, 1, 2 or 3 and the sum of $a+b$ is not greater than 3, (b) at least one siloxane unit per molecule of the formula

in which R is the same as above, c is 0, 1 or 2 and A represents a radical of the formula

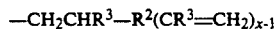

in which $R^2$ is a divalent, trivalent or tetravalent hydrocarbon radical having from 1 to 25 carbon atoms per radical, $R^3$ is a hydrogen atom or an alkyl radical having from 1 to 6 carbon atoms per radical and x is 2, 3 or 4, and at least one unit per molecule selected from the group consisting of units of the formulas

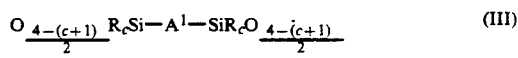

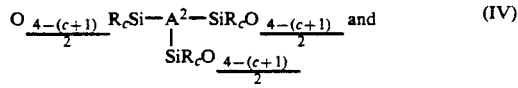

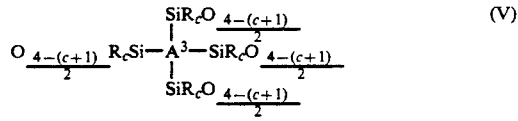

in which R and c are the same as above, $A^1$ is a radical of the formula

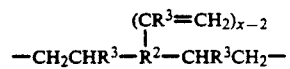

in which $R^2$, $R^3$ and x are the same as above, $A^2$ is a radical of the formula

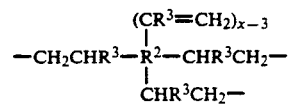

in which $R^2$, $R^3$ and x are the same as above, with the proviso that $R^2$ is not a divalent hydrocarbon radical, and $A^3$ is a radical of the formula

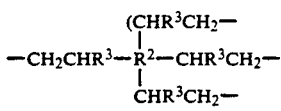

in which $R^2$ and $R^3$ are the same as above, with the proviso that $R^2$ is not a divalent or trivalent hydrocarbon radical.

The invention also relates to a process for preparing siloxane copolymers which comprises reacting an organic compound (1) containing at least two aliphatic double bonds with an organopolysiloxane (2) having an average of more than one Si-bonded hydrogen atom per molecule in the presence of a catalyst (3) which promotes the addition of Si-bonded hydrogen to an aliphatic double bond.

DETAILED DESCRIPTION OF THE INVENTION

The preferred siloxane copolymers containing alkenyl groups are those which comprise
(a) siloxane units of the formula $$R_2SiO \qquad (I')$$

(b) an average of more than one siloxane unit per molecule of the formula

  (II') and (c) an average of at least one unit per molecule selected from the group consisting of units of the formulas

 and  (III')

  (IV')

in which R, A, $A^1$ and $A^2$ are the same as above.

The siloxane copolymers containing alkenyl groups more preferably contain an average of at least two siloxane units of formula (II') per molecule.

The invention also relates to a process for preparing siloxane copolymers containing alkenyl groups, which comprises reacting an organic compound (1) containing at least two aliphatic double bonds of the general formula $$R^2(CR^3\!=\!CH_2)_x$$

in which $R^2$ is a divalent, trivalent or tetravalent hydrocarbon radical having from 1 to 25 carbon atoms per radical, $R^3$ is a hydrogen atom or an alkyl radical having from 1 to 6 carbon atoms per radical and x is 2, 3 or 4, with an organopolysiloxane (2) having an average of more than one Si-bonded hydrogen atom per molecule, in the presence of a catalyst (3) which promotes the addition of Si-bonded hydrogen to an aliphatic double bond, in which the ratio between the aliphatic double bond in the organic compound (1) and the Si-bonded hydrogen in the organopolysiloxane (2) is such that the alkenyl containing siloxane copolymers thus obtained have an average of more than one alkenyl group per molecule of the formula —$CR^3\!=\!CH_2$, in which $R^3$ is the same as above.

Siloxane copolymers which contain alkenyl groups and have an average of at least 1.5 alkenyl groups per molecule of the formula —$CR^3\!=\!CH_2$ and more preferably an average of at least two alkenyl groups per molecule of the formula —$CR^3\!=\!CH_2$, in which $R^3$ is the same as above, are preferably prepared in the process of this invention.

The siloxane copolymers of this invention which contain alkenyl groups preferably have a viscosity of from 5 to 500,000 mPa.s at 25° C., and more preferably from 10 to 10,000 mPa.s at 25° C.

In the alkenyl containing siloxane copolymers of this invention, the siloxane blocks are bonded to one another via hydrocarbon groups, thereby resulting in a hydrocarbon-siloxane block structure. Preferably, the sum of hydrocarbon groups, A, $A^1$, $A^2$ and $A^3$ in the siloxane copolymers containing alkenyl groups is from 0.1 to 70% by weight, and more preferably from 1 to 10% by weight, based on the total weight of the siloxane copolymers containing alkenyl groups.

The polyaddition process of this invention readily leads to a polymer distribution with respect to the siloxane blocks and the hydrocarbon blocks. Such a "polyadduct" usually also contains lower oligomers, which also include adducts which contain only one siloxane block and two hydrocarbon blocks.

Examples of radicals represented by R are alkyl radicals, such as the methyl, ethyl, n-propyl, iso-propyl, 1-n-butyl, 2-n-butyl, iso-butyl, tert-butyl, n-pentyl, iso-pentyl, neo-pentyl and tert-pentyl radicals; hexyl radicals such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such a the n-octadecyl radical; cycloalkyl radicals, such as the cyclopentyl, cyclohexyl and cycloheptyl radicals and methylcyclohexyl radicals; aryl radicals, such as the phenyl, naphthyl, anthryl and phenanthryl radicals; alkaryl radicals, such as o-, m- and p-tolyl radicals, xylyl radicals and ethylphenyl radicals; and aralkyl radicals, such as the benzyl radical and the α- and β-phenylethyl radical. The methyl radical is preferred.

Examples of halogenated radicals represented by R are haloalkyl radicals, such as the 3,3,3-trifluoro-n-propyl radical, the 2,2,2,2',2',2'-hexafluoroisopropyl radical and the heptafluoroisopropyl radical, and haloaryl radicals, such as the o-, m- and p-chlorophenyl radicals.

Examples of alkyl radicals represented by $R^1$ are methyl, ethyl, n- propyl, iso-propyl, 1-n-butyl, 2-n-butyl, iso-butyl and tert-butyl radicals. The methyl and ethyl radicals are the preferred $R^1$ radicals. Examples of alkyl radicals represented by $R^1$ which are substituted by an ether oxygen atom are the methoxyethyl and ethoxyethyl radicals.

Examples of alkyl radicals represented by $R^3$ are the methyl, ethyl, n-propyl, iso-propyl, 1-n-butyl, 2-n-butyl, iso-butyl, tert-butyl, n-pentyl, iso-pentyl, neo-pentyl and tert-pentyl radicals and hexyl radicals, such as the n-hexyl radical. $R^3$ is preferably a hydrogen atom.

Examples of an organic compound (1) which contains at least two aliphatic double bonds and is employed in the process of this invention are 1,5-hexadiene, 1,7-octadiene, 1,9-decadiene, 1,11-dodecadient, 1,13-tetradecadiene, 3,5-dimethyl-1,6-heptadiene, 3,5-dimethyl-4-vinyl-1,6-heptadiene, 1,2.4-trivinylcyclohexane, 1,3,5- trivinylcyclohexane, 1,4-divinylbenzene and 1,2,3,4-tetravinylcyclobutane. The 1,2,4-trivinylcyclohexane and 1,5-hexadiene are preferred.

Examples of the radicals represented by $R^2$ are those of the formulas

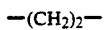

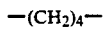

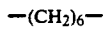

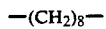

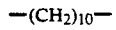

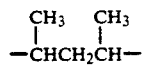

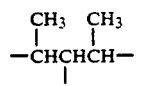

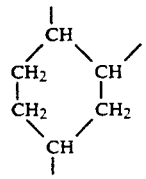

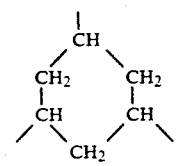

—C$_6$H$_4$— and

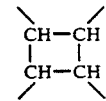

The radicals of the formulas

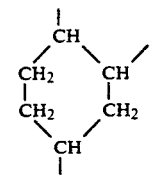  and  —C$_2$H$_4$— are the preferred $R^2$ radicals.

The organopolysiloxanes (2) employed in the process of this invention preferably contain an average of at least 1.5 Si-bonded hydrogen atoms, and more preferably an average of at least 2 Si-bonded hydrogen atoms per molecule.

The organopolysiloxanes (2) employed in the process of this invention more preferably contain from 2 to 4 Si-bonded hydrogen atoms per molecule.

One type of organopolysiloxane (2) or various types of organopolysiloxane (2) can be employed in the process of this invention. The organopolysiloxanes (2) are also mixtures resulting from their preparation, for example, organopolysiloxanes having two Si-bonded hydrogen atoms per molecule may also contain organopolysiloxanes having only one Si-bonded hydrogen atom per molecule.

Organopolysiloxanes (2) which are preferably employed in the process of this invention are those of the general formula $$H_e R_f SiO_{\frac{4-(e+f)}{2}} \qquad (VI)$$

in which R is the same as above, e is 0 or 1, with an average of from 0.005 to 1.0, f is 0, 1, 2 or 3, with an average of from 1.0 to 2.0, and the sum of e+f is not greater than 3.

Organopolysiloxanes (2) which are preferably employed in the process of this invention are those of the general formula $$H_d R_{3-d} SiO(SiR_2O)_o(SiRHO)_p SiR_{3-d} H_d \qquad (VII)$$

in which R is the same as above, d is 0 or 1, o is 0 or an integer of from 1 to 1000 and p is 0 or an integer of from 1 to 6.

The organopolysiloxanes (2) preferably have a viscosity of from 0.5 to 20,000 mPa.s at 25° C., and more preferably from 5 to 1,000 mPa.s at 25° C.

Preferred examples of organopolysiloxanes of formula (VII) are copolymers of dimethylhydrosiloxane and dimethylsiloxane units, copolymers of dimethylhydrosiloxane, dimethylsiloxane and methylhydrosiloxane units, copolymers of trimethylsiloxane and methylhydrosiloxane units and copolymers of trimethylsiloxane, dimethylsiloxane and methylhydrosiloxane units.

In addition to the preferred examples, it is also possible to employ those organopolysiloxanes (2) which additionally contain up to 20 mol percent of SiO$_2$ units and/or up to 40 mol percent of RSiO$_{3/2}$ units, such as methylsiloxane and/or phenylsiloxane units. If these organopolysiloxanes (2) are employed with an organic compound (1) where x=2, copolymers in which the branching is present in the siloxane block are obtained.

Processes for preparing organopolysiloxanes having at least two Si-bonded hydrogen atoms per molecule, including those of the preferred type, are generally known.

The organic compound (1) is employed in the process of this invention in amounts such that the aliphatic double bond in the organic compound (1) is present in a ratio to the Si-bonded hydrogen in the organopolysiloxane (2) of preferably from 1.1 :1 to 20:1, and more preferably from 1.5:1 to 10:1, and in particular from 1.5:1 to 5:1.

Catalysts (3) which promote the addition of Si-bonded hydrogen to an aliphatic double bond and which can be employed in the process of this invention are the same catalysts which have been, or could have been, employed previously in promoting the addition of Si-bonded hydrogen to an aliphatic double bond. The catalysts (3) are preferably a metal from the group of platinum metals, or a compound or complex from the group of platinum metals. Examples of such catalysts are metallic and finely divided platinum, which can be supported on, for example, silicon dioxide, aluminum oxide or active charcoal, and compounds or complexes of platinum, such as platinum halides, for example PtCl₄, H₂PtCl₆.6H₂O, Na₂PtCl₄.4H₂O, platinum-olefin complexes, platinum-alcohol complexes, platinum-alcoholate complexes, platinum-ether complexes, platinum-aldehyde complexes, platinum-ketone complexes, including reaction products of H₂PtCl₆.6H₂O and cyclohexanone, platinum-vinylsiloxane complexes, such as platinum-1,3-divinyl-1,1,3,3-tetramethyldisiloxane complexes with or without a detectable amount of inorganically bonded halogen, bis-(gammapicoline)-platinum dichloride, trimethylenedipyridine-platinum dichloride, dicyclopentadieneplatinum dichloride, dimethylsulfoxide-ethyleneplatinum(II) dichloride, cyclooctadiene-platinum dichloride, norbornadiene-platinum dichloride, gamma-picoline-platinum dichloride, cyclopentadiene-platinum dichloride and reaction products of platinum tetrachloride with olefin and primary amines or secondary amines or primary and secondary amines according to U.S. Pat. No. 4,292,434, such as the reaction product of platinum tetrachloride, dissolved in 1-octene, with sec-butylamine, or ammonium-platinum complexes according to EP-B 110,370.

The catalyst (3) is preferably employed in amounts of from 0.5 to 1,000 ppm by weight (parts by weight per million parts by weight), preferably in amounts of from 2 to 50 ppm by weight, calculated as elemental platinum and based on the total weight of organic compound (1) and organopolysiloxane (2).

The process of this invention is preferably carried out under the pressure of the surrounding atmosphere, that is to say, for example, under 1020 hPa (absolute), but it can also be carried out under higher or lower pressures. The process of this invention is preferably carried out at a temperature of from 50° C. to 150° C., and more preferably from 80° C. to 120 C.

Since the organic compound (1) which contains at least two aliphatic double bonds, for example 1,2,4-trivinylcyclohexane, tends to polymerize at higher temperatures, inhibitors of free radicals, such as 4-methoxyphenol, 2,6-bis(tert-butyl)-4-methylphenol, phenothiazine, hydroquinone or pyrocatechol, can be co-used in the process of this invention. The inhibitors of free radicals are preferably employed in amounts of from 10 to 500 ppm by weight, based on the total weight of organic compound (1) and organopolysiloxane (2).

Inert organic solvents can be used in the process of this invention, although the use of inert organic solvents is not preferred. Examples of inert organic solvents are toluene, xylene, octane isomers, butyl acetate, 1,2-dimethoxyethane, tetrahydrofuran and cyclohexane.

Excess organic compound (1) and any inert organic solvent which may have been used are preferably removed by distillation from the siloxane copolymers which contain alkenyl groups and are prepared by the process of this invention.

The siloxane copolymers which contain alkenyl groups and are prepared by the process of this invention may optionally be equilibrated with an organopolysiloxane (4).

The organopolysiloxanes (4) employed are preferably those selected from the group consisting of linear organopolysiloxanes containing terminal triorganosiloxy groups, of the formula $R_3SiO(SiR_2O)_rSiR_3$ in which R is the same as above and r is 0 or an integer having a value of from 1 to 1500, linear organopolysiloxanes containing terminal hydroxyl groups, of the formula $HO(SiR_2O)_sH$ in which R is the same as above and s is an integer having a value of from 1 to 1500, cyclic organopolysiloxanes of the formula $(R_2SiO)_t$ in which R is the same as above and t is an integer of from 3 to 12, and copolymers of units of the formulas $R_2SiO$ and $RSiO_{3/2}$ in which R is the same as above.

The ratio of the amounts of the organopolysiloxane (4) employed in the optionally conducted equilibration and the siloxane copolymers containing alkenyl groups is determined merely by the desired content of alkenyl groups in the siloxane copolymers produced during the equilibration and by the desired average chain length.

Basic catalysts which promote the equilibration are preferably employed in the optionally conducted equilibration. Examples of such catalysts are alkali metal hydroxides, such as sodium hydroxide and potassium hydroxide, trimethylbenzylammonium hydroxide and tetramethylammonium hydroxide, in which the alkali metal hydroxides are preferred. Alkali metal hydroxides are preferably used in amounts of from 50 to 10,000 ppm by weight, and more preferably from 500 to 2,000 ppm by weight, based on the total weight of siloxane copolymer containing alkenyl groups employed and organopolysiloxane (4) employed. Although it is possible to use acid equilibration catalysts, this is not preferred.

The optionally conducted equilibration is preferably carried out at 100° C. to 150° C. under the pressure of the surroundinq atmosphere, that is, at 1020 hPa (absolute). If desired however, hiqher or lower pressures can also be used. The equilibration is preferably carried out in 5 to 20% by weight, based on the total weight of the particular siloxane copolymer containing alkenyl groups which is employed and the particular organopolysiloxane (4) employed, of a water-immiscible solvent, such as toluene. The catalyst can be rendered inactive before the equilibrated mixture is worked up.

The process of this invention can be carried out batchwise, semi-continuously or continuously.

The siloxane copolymers of this invention, containing alkenyl groups, can be crosslinked with organopolysiloxanes containing Si-bonded hydrogen in the presence of hydrosilylation catalysts. The siloxane copolymers of this invention, which contain alkenyl groups, can also be crosslinked with organic polymers containing mercapto groups.

The siloxane copolymers of this invention, which contain alkenyl groups, are preferably used in crosslinkable compositions which contain (a) a siloxane copolymer containing alkenyl groups, (b) an organopolysiloxane containing Si-bonded hydrogen atoms and (c) a catalyst which promotes the addition of Si-bonded hydrogen to an aliphatic double bond.

The crosslinkable compositions containing the siloxane copolymers of this invention are preferably used in the production of non-stick coatings, for example in the production of release papers.

The self-adhesive materials joined with the release paper are produced by the off-line or the in-line process. In the off-line process, the silicone composition is applied to the paper and crosslinked, an adhesive film lying, for example, on a label face paper is then applied to the coated paper in a subsequent stage, usually after the release paper has been wound onto a reel and after the reel has been stored, and the laminate is then pressed together. In the in-line process, the silicone composition is applied to the paper and crosslinked, the silicone coating is coated with the adhesive, the label face paper is then applied to the adhesive and the laminate is finally pressed together. It has been found in the in-line process that the adhesive, especially if this is an acrylic adhesive, binds with the silicone coating on the release paper if application of the adhesive to the release paper coated with the silicone composition takes place a short time after crosslinking of the silicone composition. This binding between the silicone coating and the adhesive is observed if organopolysiloxanes containing vinyl groups are cross-linked with organopolysiloxanes containing Si-bonded hydrogen atoms in the preparation of the coatings.

When compositions of this invention are used in the production of release papers, the binding between the silicone coating and the adhesive, such as acrylic adhesive, does not occur in the in-line process.

One type of siloxane copolymer (a) or different types of siloxane copolymer (a) can be employed in the compositions of this invention.

Siloxane copolymers containing units of the formula (I), (II) and at least one unit of the formula (III), (IV) or (V), preferably containing units of the formula (I'), (II') and at least one unit of the formula (III') or (IV'), are preferably employed as constituent (a).

The same organopolysiloxanes containing Si-bonded hydrogen atoms which have been or could have been employed heretofore with organopolysiloxanes containing vinyl groups, and a catalyst which promotes the addition of Si-bonded hydrogen to an aliphatic double bond can be used as constituent (b) in the composition of this invention.

The organopolysiloxanes (b) preferably contain at least 3 Si-bonded hydrogen atoms.

Organopolysiloxanes of formula (VI), and in particular those of the formula

wherein R is the same as above, g is 0 or 1, k is 0 or an integer of from 1 to 100 and 1 is 0 or an integer of from 1 to 100, are preferably employed as constituent (b).

Examples of organopolysiloxanes (b) are, in particular, copolymers of dimethylhydrosiloxane, methylhydrosiloxane, dimethylsiloxane and trimethylsiloxane units, copolymers of trimethylsiloxane, dimethylhydrosiloxane and methylhydrosiloxane units, copolymers of trimethylsiloxane, dimethylsiloxane and methylhydrosiloxane units, copolymers of methylhydrosiloxane and trimethylsiloxane units, copolymers of methylhydrosiloxane, diphenylsiloxane and trimethylsiloxane units, copolymers of methylhydrosiloxane, phenylmethylsiloxane, trimethylsiloxane and/or dimethylhydrosiloxane units, copolymers of methylhydrosiloxane, dimethylsiloxane, diphenylsiloxane, trimethylsiloxane and/or dimethylhydrosiloxane units and copolymers of dimethylhydrosiloxane, trimethylsiloxane, phenylhydrosiloxane, dimethylsiloxane and/or phenylmethylsiloxane units.

Processes for preparing organopolysiloxanes (b), including those organopolysiloxanes (b) of the preferred type, are generally known.

The organopolysiloxane (b) is preferably employed in amounts of from 0.5 to 6, and more preferably from 1 to 3 gram atoms of Si-bonded hydrogen per mol of alkenyl group —CR$^3$=CH$_2$ in the siloxane copolymers (a) containing alkenyl groups.

The same catalysts which have been or could have been employed heretofore for promoting the crosslinking of compositions containing aliphatic double bonds with compounds which comprise Si-bonded hydrogen can be used as the catalyst (c) to promote the addition of Si-bonded hydrogen to an aliphatic double bond in the compositions of this invention. The above-mentioned catalysts (3) are preferably used as constituent (c).

Catalyst (c) is preferably employed in amounts of from 5 to 500 ppm by weight (parts by weight per million parts by weight), and more preferably from 10 to 200 ppm by weight, calculated as elemental platinum metal and based on the total weight of the siloxane copolymer (a) and organopolysiloxane (b).

Examples of additional constituents which can be used in the compositions of this invention are agents which delay the addition of Si-bonded hydrogen to an aliphatic double bond at room temperature, so-called inhibitors (d), agents for adjusting the separating force, solvents, adhesion promoters and pigments.

All the inhibitors which have been or could have been used heretofore for the same purpose can also be used as inhibitors (d) in the compositions of this invention. Examples of inhibitors are 1,3-divinyl-1,1,3,3-tetramethyldisiloxane, benzotriazole, dialkylformamides, alkylthioureas, methyl ethyl ketoxime, organic or organosilicon compounds having a boiling point of at least 25° C. under 1012 mbar (absolute) and at least one aliphatic triple bond, according to U.S. Pat. No. 3,445,420, such as 1-ethynylcyclohexan-1-ol, 2-methyl-3-butyn-2-ol, 3-methyl-1-pentyn-3-ol, 2,5-dimethyl-3-hexyn-2,5-diol and 3,5-dimethyl-1-hexyn-3-ol, inhibitors according to U.S. Pat. No. 2,476,166, such as a mixture of diallyl maleate and vinyl acetate, and inhibitors according to U.S. Pat. No. 4,504,645, such as maleic acid monoesters.

The inhibitor (d) is preferably employed in amounts of from 0.001 to 10% by weight, based on the total weight of the siloxane copolymers (a) and organopolysiloxanes (b).

Examples of agents for adjusting the separating force of the non-stick coatings produced with the compositions of this invention are silicone resins having units of the formulas

so-called MQ resins, in which R$^4$ is a hydrogen atom, a methyl radical, a vinyl radical or a radical A (A is the same as above), and the units of the formula R$^4$(CH$_3$)$_2$SiO$_{\frac{1}{2}}$ can be the same or different. The ratio of units of the formula R$^4$(CH$_3$)$_2$SiO$_{\frac{1}{2}}$ to units of the formula SiO$_2$ is preferably 0.6 to 2. The silicone resins are preferably employed in amounts of from 5 to 80% by weight, based on the total weight of the siloxane copolymers (a) and organopolysiloxanes (b).

The solvents optionally used in the compositions of this invention can be the same solvents which have been or could have been used heretofore in compositions containing organopolysiloxanes containing Si-bonded vinyl groups, organopolysiloxanes containing Si-bonded hydrogen and a catalyst which promotes the addition of Si-bonded hydrogen to an aliphatic double bond. Examples of such solvents are benzines, for example alkane mixtures having a boiling range from 80° C. to 110° C. under 1012 mbar (absolute), n-heptane, benzene, toluene and xylenes, halogenated alkanes having from 1 to 6 carbon atoms, such as methylene chloride, trichloroethylene and perchloroethylene, ethers, such as di-n-butyl ether, esters, such as ethyl acetate, and ketones, such as methyl ethyl ketone and cyclohexanone.

If organic solvents are used, they are generally employed in amounts of from 10 to 95% by weight, based on the weight of the siloxane copolymer (a) containing alkenyl groups.

Although the sequence of mixing the constituents (a), (b), (c) and if appropriate (d) is not critical, it is preferred to add constituent (c), that is to say the catalyst, as the last component to the mixture containing the other constituents.

The crosslinking of the compositions of this invention is preferably carried out at 50° C. to 150° C. One advantage of the compositions of this invention is that rapid crosslinking is already achieved at low temperatures. Ovens, for example circulating air drying cabinets, heating tunnels, heated rolls, heated plates or heat rays in the infrared range, are preferably used as the sources of energy for crosslinking by heating.

The compositions of this invention can also be crosslinked by irradiation with ultraviolet light or by irradiation with UV and IR light, as well as by heating. The ultraviolet light used is usually that having a wave length of 253.7 nm. A wide range of lamps which emit ultraviolet light having a wave length of 200 to 400 nm, and which preferably emit ultraviolet light having a wave length of 253.7 nm, are commercially available.

The application of the compositions of this invention to the surfaces to be rendered non-stick can be carried out in any desired manner for the production of coatings from liquid substances, for example by dipping, brushing, pouring, spraying, rolling on, printing, for example by means of an offset gravure coating device, knife or doctor blade coating or by means of an air brush.

The surfaces which are to be rendered non-stick can be surfaces of any desired substances which are solid at room temperature under 1012 mbar (absolute). Examples of such surfaces are those of paper, wood, cork and films of plastic, for example polyethylene films or polypropylene films, woven and non-woven cloth of naturally occurring or synthetic fibers or glass fibers, ceramic objects, glass, metals, polyethylene-coated paper and pasteboard, including pasteboard of asbestos. The above mentioned polyethylene can in each case be high, medium or low pressure polyethylene. The paper can be inferior grades of paper, such as absorbent paper, including base kraft paper, that is to say kraft paper which has not been pretreated with chemicals and/or polymeric naturally occurring substances, having a weight of 60 to 150 g/m², unsized paper, paper of low freeness value, paper containing wood, non-satinized or non-calendered paper, paper which, by the use of a dry glazing cylinder during its production and without further involved measures, is smooth on one side and is therefore called "paper machine-smoothed on one side", non-coated paper or paper produced from waste paper, that is to say so-called recycled paper. The paper to be treated according to this invention can of course, however, also be high-quality grades of paper, such as low-absorbent paper, sized paper, paper having a high freeness value, wood-free paper, calendered or satinized paper, glassine paper, parchment paper or precoated paper. The pasteboard can also be of high or inferior quality.

The compositions of this invention are suitable, for example, for the production of release, covering and interleaving paper, including interleaving paper which is employed in the production of, for example, cast or decorative films or of foams, including those of polyurethane. The compositions of this invention are furthermore suitable, for example, for the production of release, covering and interleaving pasteboard, films and cloths for finishing the reverse sides of self-adhesive tapes or self-adhesive films or of the written sides of self-adhesive labels. The compositions of this invention are also suitable for finishing packaging materials, such as those of paper, cardboard boxes, metal foils and drums, for example pasteboard, plastic, wood or iron, which is intended for storage and/or transportation of sticky goods, such as adhesives, sticky foodstuffs, for example cakes, honey, sweets and meat, bitumen, asphalt, greased materials and crude rubber. Another example of the use of the compositions of this invention is the finishing of carriers for transfer of pressure-sensitive adhesive layers in the so-called "transfer process".

The compositions of this invention may be used in the production of self-adhesive materials joined with the release paper either by the off-line process or by the in-line process.

EXAMPLE 1

About 330 g of a copolymer of trimethylsiloxane, dimethylsiloxane and hydromethylsiloxane units having a viscosity of 90 $mm^2.s^{-1}$ at 25° C. and containing 0.2 g of Si-bonded hydrogen are mixed with 33 g (0.4 mol) of 1,5-hexadiene and 4 mg of platinum in the form of a solution of $H_2PtCl_6.6H_2O$ in isopropanol. After 2 hours at 60° C. and an additional 2 hours at 80° C., in each case under a nitrogen atmosphere, about 99% of the Si-bonded hydrogen atoms of the copolymer have reacted. The crude product is concentrated at 80° C. under about 5 hPa and 335 g of a clear oil having a viscosity of 190 $mm^2.s^{-1}$ at 25° C. are obtained. The copolymer consists of siloxane blocks which are substituted by Si-bonded 5-hexenyl groups (A) and bonded via $C_6$-alkylene groups ($A^1$). The copolymer contains 4% by weight of hydrocarbon groups A and $A^1$, based on the total weight of the copolymer. The copolymer has an iodine number (=number which indicates how many g of iodine are bonded by 100 g of substance) of 9.9.

EXAMPLE 2

The procedure of Example 1 is repeated, except that 425 g of the copolymer having a viscosity of 94 $mm^2.s^{-1}$ at 25° C. and 0.047% by weight of Si-bonded hydrogen are employed instead of 330 g of the copolymer having a viscosity of 90 $mm^2.s^{-1}$ at 25° C., and 34.5 g of 1,9-decadiene are employed instead of 33 g of 1,5-hexadiene. About 430 g of a copolymer having a viscosity of 20,000 $mm^2.s^{-1}$ at 25° C. and an iodine number of 7.52 are obtained. The resultant copolymer consists of siloxane units which are substituted by Si-bonded 9-decenyl groups and bonded via $C_{10}$-alkylene groups.

EXAMPLE 3

About 67 g of 1,2,4-trivinylcyclohexane (corresponding to 1.2 equivalents of C=C) are mixed with 20 mg of 4-methoxyphenol and 5 mg of platinum in the form of a solution of platinum tetrachloride in 1-octene. About 906 g of an a,ω-dihydrodimethylpolysiloxane containing 0.35 g of Si-bonded hydrogen are added dropwise at 100° C. under a nitrogen atmosphere over a period of 5 hours. After an additional 3 hours, 99% of the Si-bonded hydrogen atoms of the a,ω-dihydrodimethylpolysiloxane have reacted, and the crude product is concentrated at 100° C. under 2 hPa. About 910 g of a copolymer having a viscosity of 416 mm$^2$.s$^{-1}$ at 25° C. and an iodine number of 11.0 are obtained. The copolymer contains dimethylpolysiloxane blocks which are bonded via cyclic hydrocarbon groups (A$^1$, A$^2$) and contain terminal siloxane units and Si-bonded β-(divinylcyclohexyl)ethyl groups (A). The copolymer contains 4% by weight of hydrocarbon groups A, A$^1$ and A$^2$, based on the total weight of the copolymer.

EXAMPLE 4

About 40 g (0.25 mol) of 1,13-tetradecadiene are mixed with 2.5 mg of platinum in the form of a solution of platinum tetrachloride in 1-octene. About 555 g of an a,ω-dihydrodimethylpolysiloxane containing 0.23 g of Si-bonded hydrogen are added dropwise to the mixture under a nitrogen atmosphere at 80° C. After 3 hours, about 98% of the Si-bonded hydrogen atoms of the a,ω-dihydrodimethylpolysiloxane have reacted. Volatile constituents are removed at 120° C. under 10$^{-2}$ hPa. About 570 g of a copolymer having a viscosity of 331 mm$^2$.s$^{-1}$ at 25° C., an average molecular weight of about 9000 and an iodine number of 5.64 are obtained. The linear copolymer consists of dimethylpolysiloxane blocks bonded via C$_{14}$-alkylene groups (A$^1$), and contains terminal Si-bonded 13-tetradecenyl groups (A). The polymer contains 6% by weight of hydrocarbon groups A and A$^1$, based on the total weight of the copolymer.

EXAMPLE 5

About 252 g of 1,2,4-trivinylcyclohexane (corresponding to 4.5 equivalents of C=C) are mixed with 25 mg of 4-methoxyphenol and 3 mg of platinum in the form of a solution of platinum tetrachloride in 1,3-divinyltetramethyldisiloxane. About 81 g of 1,1,3,3-tetramethyldisiloxane are added dropwise at 100° C. under a nitrogen atmosphere over a period of 2 hours. After an additional 5 hours, 99.5% of the Si-bonded hydrogen atoms of the 1,1,3,3-tetramethyldisiloxane have reacted. The volatile constituents are removed at 100° C. under 2 hPa. About 220 g of a clear pale yellow oil having a viscosity of 121 mm$^2$.s$^{-1}$ at 25° C. and an iodine number of 174 are obtained. The copolymer contains tetramethyldisiloxane units which are bonded via cyclic hydrocarbon groups (A$^1$, A$^2$) and contain terminal siloxane units and Si-bonded β-(divinylcyclohexyl)ethyl groups (A). The copolymer contains 65% by weight of hydrocarbon groups A, A$^1$ and A$^2$, based on the total weight of the copolymer.

EXAMPLE 6

About 223 g of 1,2,4-trivinylcyclohexane (corresponding to 4.0 equivalents of C=C) are mixed with 25 mg of 4-methoxyphenol and 5 mg of platinum in the form of a solution of platinum tetrachloride in 1,3-divinyltetramethyldisiloxane. About 304 g of a short-chain a,ω-dihydrodimethylpolysiloxane containing 1.2 g of Si-bonded hydrogen are added dropwise at 100° C. under a nitrogen atmosphere over a period of 2 hours. After an additional hour, 99% of the Si-bonded hydrogen atoms of the a,ω-dihydrodimethylpolysiloxane have reacted. The volatile constituents are removed at 100° C. under 2 hPa. About 410 g of a copolymer having a viscosity of 65 mm$^2$.s$^{-1}$ at 25° C. and an iodine number of 84 are obtained. The copolymer contains dimethylsiloxane blocks with an average of seven siloxane units, which are bonded via cyclic hydrocarbon groups (A$^1$, A$^2$) and terminal siloxane units having the Si-bonded β-(divinylcyclohexyl)ethyl groups (A). The copolymer contains 30% by weight of hydrocarbon groups A, A$^1$ and A$^2$, based on the total weight of the copolymer.

EXAMPLE 7

About 126 g of 1,2,4-trivinylcyclohexane are mixed with 50 mg of 4-methoxyphenol and 9 mg of platinum tetrachloride. About 425 g of a copolymer of trimethylsiloxane, dimethylsiloxane and hydromethylsiloxane units having a viscosity of 94 mm$^2$.s$^{-1}$ at 25° C. and containing 0.047% by weight of Si-bonded hydrogen are added dropwise at 100° C. under a nitrogen atmosphere over a period of about 10 minutes. After an additional reaction time of 24 hours, the volatile constituents are removed at 100° C. under 2 hPa. About 430 g of a clear pale yellow oil which has a viscosity of 366 mm$^2$.s$^{-1}$ at 25° C. and an iodine number of 17.0 are obtained. The oil is soluble in toluene and gives a clear solution. According to the $^1$H-NMR spectrum, the ratio of H$_2$C=CH— to Si—CH$_2$—CH$_2$— groups is 65:35 and the copolymer contains 7% by weight of hydrocarbon groups A, A$^1$ and A$^2$, based on the total weight of the copolymer. The siloxane blocks in the copolymer are branched via the cyclic hydrocarbon chains (A$^1$, A$^2$). The copolymer contains Si-bonded β-(divinylcyclohexyl)ethyl groups (A).

EXAMPLE 8

About 425 g of a copolymer of trimethylsiloxane, dimethylsiloxane and hydromethylsiloxane units having a viscosity of 94 mm$^2$.s$^{-1}$ at 25° C. and contains 0.047% by weight of Si-bonded hydrogen are mixed with 20.5 g of 1,5-hexadiene and 4 mg of platinum in the form of a solution of H$_2$PtCl$_6$.6H$_2$O in isopropanol. The mixture is heated at 60° C. for 2 hours and at 80° C. for an additional 2 hours, under a nitrogen atmosphere. Volatile constituents are then removed at 100° C. under 2 hPa (absolute). A clear oil having a viscosity of 480 mm$^2$.s$^{-1}$ at 25° C. is obtained. The non-crosslinked copolymer consists of siloxane blocks which are substituted by Si-bonded 5-hexenyl groups (A) and bonded via C$_6$-alkylene groups (A$^1$). The copolymer contains about 3% by weight of hydrocarbon groups A and A$^1$, based on the total weight of the copolymer. The copolymer has an iodine number of 7.7 and, according to the $^1$H-NMR spectrum, the ratio of H$_2$C=CH— (5-hexenyl group) to Si—CH$_2$— (linkage point of the siloxane and hydrocarbon block) groups is 0.60. The copolymer contains an average of more than one C$_6$-alkylene group per molecule.

EXAMPLE 9

About 488 g of an a,ω-dihydrodimethylpolysiloxane which contains 0.041% by weight of Si-bonded hydrogen are mixed with 13.8 g of 1,5-hexadiene and 5 mg of platinum in the form of a solution of platinum tetrachloride in 1-octene. After the mixture has been heated at 60° C. for one hour, more than 99% of the Si-bonded hydrogen atoms of the a,ω-dihydrodimethylpolysiloxane have reacted. The volatile constituents are removed at 100° C. under 2 hPa (absolute). About 490 g of a clear colorless oil having a viscosity of 370 mm$^2$.s$^{-1}$ at 25° C. are obtained. The linear copolymer consists of dimethylpolysiloxane blocks bonded via $C_6$-alkylene groups (A$^1$), and contains terminal Si-bonded 5-hexenyl groups (A). The copolymer contains about 2.5% by weight of hydrocarbon groups A and A$^1$, based on the total weight of the copolymer. The copolymer has an iodine number of 4.3. According to the $^1$H-NMR spectrum, the ratio of $H_2C=CH-$ (5-hexenyl group) to Si-$CH_2-$ (bridge unit $O_{1/2}(CH_3)_2SiCH_2(CH_2)_4CH_2Si(CH_3)_2O_{1/2}$ and terminal unit $H_2C=CH(CH_2)_3CH_2Si(CH_3)_2O_{1/2}$) is 0.50. The copolymer thus contains an average of one $C_6$-alkylene group per molecule.

EXAMPLE 10

About 100 parts by weight of the hexenyl polymer from Example 8 having lateral hexenyl groups and hexane-1,6-diyl bridges are mixed with 0.25 part by weight of ethynylcyclohexanol and 2.5 parts by weight of a copolymer of methylhydro- and trimethylsiloxane units having an average of 25 siloxane units. A platinum-divinyltetramethylsiloxane complex is added as a catalyst to the mixture, so that it contains 100 ppm by weight of platinum. The ratio of SiH groups to $H_2C=CH-$ Groups is about 1.2.

The ready-to-use mixture (pot life about 6 days) thus prepared is applied by means of a doctor blade to SCK paper (super-calendered kraft) at a coating thickness of about 1.2 μm. The coating is cured at 95° C. in a circulating air oven for 8 seconds, the surface reaching a temperature of 68° C. The coated paper is immediately laminated with the acrylic adhesive Gelva 1753 (obtainable from Monsanto) and another layer of paper. According to FINAT, the following separating forces result:

| Time | Separating force (g/inch) |
|---|---|
| immediately | 131 |
| after 3 days | 133 |

The laminate shows no "acrylic lock-up".

EXAMPLE 11

A composition similar to that of Example 10 is prepared, except that instead of ethynylcyclohexanol, 0.20 part by weight of 2-methyl-3-butyn-2-ol is substituted for the ethynylcyclohexanol and a copolymer of methylhydrido-, dimethyl- and trimethylsiloxane units having a viscosity of 42 mm$^2$/s and an active hydrogen content of 1.10% by weight is substituted for the copolymer of Example 10. When 5.6 parts by weight of this copolymer is employed, the ratio of SiH groups to $H_2C=CH-$ groups is about 2.0.

The ready-to-use mixture (pot life about 4 days) is applied to paper (Buxil N 925, Bosso) in a coating thickness of about 1.2 μm and cured in a circulating air oven at 80° C. for 22 seconds. The coating is abrasion-resistant.

About 30 minutes after the coating is applied, the release paper is stuck to commercially available "Tesafilm K 7476" adhesive tapes 2.5 cm wide (Beiersdorf AG, Hamburg). The separating value and the residual adhesive force are determined according to FINAT 10 and 11:

| Measurement time | Separating force (g/inch) | Residual adhesive force (%) |
|---|---|---|
| After 20 hours | 9.0 | 103 |
| 168 hours | 11.7 | |
| 500 hours | 12.7 | |
| 1000 hours | 12.5 | |

The separating values are low and largely stable. In accordance with the high residual adhesive force, no transfer of silicone to the adhesive takes place. The silicone film shows no troublesome migration even at a low curing temperature.

What is claimed is:

1. A siloxane copolymer containing alkenyl groups, comprising
   (a) siloxane units of the formula

  (I)

in which R is a hydrocarbon radical having from 1 to 18 carbon atoms per radical or a halogenated hydrocarbon radical having from 1 to 18 carbon atoms per radical, R$^1$ is an alkyl radical having from 1 to 4 carbon atoms per radical, which can be substituted by an ether oxygen atom, a is 0, 1, 2 or 3, b is 0, 1, 2 or 3 and the sum of a+b is not greater than 3,
   (b) at least one siloxane unit per molecule of the formula

  (II)

in which R is the same as above, c is 0, 1 or 2 and A is a radical of the formula

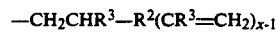

in which R$^2$ is a divalent, trivalent or tetravalent hydrocarbon radical having from 1 to 25 carbon atoms per radical, R$^3$ is a hydrogen atom or an alkyl radical having from 1 to 6 carbon atoms per radical and x is 2, 3 or 4, and
   (c) an average of at least one unit per molecule selected from the group consisting of units of the formulas

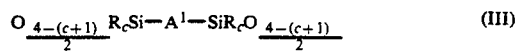  (III)

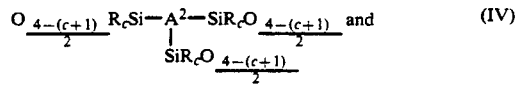  (IV)

-continued $$\underline{O_{\frac{4-(c+1)}{2}}}R_cSi\underset{\underset{SiR_cO_{\frac{4-(c+1)}{2}}}{|}}{\overset{\overset{SiR_cO_{\frac{4-(c+1)}{2}}}{|}}{-A^3-}}SiR_cO\underline{_{\frac{4-(c+1)}{2}}} \quad (V)$$

in which R and c are the same as above, $A^1$ is a radical of the formula $$-CH_2CHR^3-\underset{\underset{}{|}}{\overset{(CR^3=CH_2)_{x-2}}{R^2}}-CHR^3CH_2-$$

which $R^2$, $R^3$ and x are the same as above, $A^2$ is a radical of the formula $$-CH_2CHR^3-\underset{\underset{CHR^3CH_2-}{|}}{\overset{(CR^3=CH_2)_{x-3}}{R^2}}-CHR^3CH_2-$$

in which $R^2$, $R^3$ and x are the same as above, with the proviso that $R^2$ is not a divalent hydrocarbon radical, and $A^3$ is a radical of the formula $$-CH_2CHR^3-\underset{\underset{CHR^3CH_2-}{|}}{\overset{\overset{CHR^3CH_2-}{|}}{R^2}}-CHR^3CH_2-$$

in which $R^2$ and $R^3$ are the same as above, with the proviso that $R^2$ is not a divalent or trivalent hydrocarbon radical.

2. The siloxane copolymer of claim 1, wherein the siloxane copolymer contains
(a) siloxane units of the formula $$R_2SiO \quad (I')$$

(b) an average of more than one siloxane unit per molecule of the formula $$AR_2SiO_{1/2} \quad (II') \text{ and}$$

(c) an average of at least one unit per molecule selected from the group consisting of units of the formulas $$O_{\frac{1}{2}}R_2Si-A^1-SiR_2O_{\frac{1}{2}} \quad \text{and} \quad (III')$$

$$O_{\frac{1}{2}}R_2Si-\underset{\underset{SiR_2O_{\frac{1}{2}}}{|}}{A^2}-SiR_2O_{\frac{1}{2}} \quad (IV')$$

in which R is a hydrocarbon radical having from 1 to 18 carbon atoms per radical or a halogenated hydrocarbon radical having from 1 to 18 carbon atoms per radical, A is a radical of the formula $$-CH_2CHR^3-R^2(CR^{3'}CH_2)_{x-1}$$

in which $R^2$ is a divalent, trivalent or tetravalent hydrocarbon radical having from 1 to 25 carbon atoms per radical, $R^3$ is a hydrogen atom or an alkyl radical having from 1 to 6 carbon atoms per radical and x is 2, 3 or 4, $A^1$ is a radical of the formula $$-CH_2CHR^3-\underset{\underset{}{|}}{\overset{(CR^3=CH_2)_{x-2}}{R^2}}-CHR^3CH_2-$$

in which $R^2$, $R^3$ and x are the same as above, $A^2$ is a radical of the formula $$-CH_2CHR^3-\underset{\underset{CHR^3CH_2-}{|}}{\overset{(CR^3=CH_2)_{x-3}}{R^2}}-CHR^3CH_2-$$

in which $R^2$, $R^3$ and x are the same as above, with the proviso that $R^2$ is not a divalent hydrocarbon radical.

3. The siloxane copolymer of claim 1, wherein the radical $R^3$ is a hydrogen atom.

4. A process for preparing a siloxane copolymer containing an average of more than one alkenyl group per molecule of the fomrula $-CR^3=CH_2$, which comprises reacting an organic compound (1) containing at least two aliphatic double bonds of the general formula $$R^2(CR^3=CH_2)_x$$

in which $R^2$ is a divalent, trivalent or tetravalent hydrocarbon radical having from 1 to 25 carbon atoms per radical, $R^3$ is a hydrogen atom or an alkyl radical having from 1 to 6 carbon atoms per radical and x is 2, 3 or 4, with an organopolysiloxane (2) having an average of more than one Si-bonded hydrogen atom per molecule, selected from the group consisting of an organopolysiloxane of the general formula $$H_eR_fSiO_{\frac{4-(e+f)}{2}} \quad (VI)$$

and an organopolysiloxane of the general formula $$H_3R_{3-d}SiO(SiR_2O)_o(SiRHO)_pSiR_{3-d}H_3 \quad (VII)$$

in which R is a hydrocarbon radical having from 1 to 18 carbon atoms per radical or a halogenated hydrocarbon radical having from 1 to 18 carbon atoms per radical, d is 0, or 1, e is 0 or 1, with an average of from 0.005 to 1.0, f is 0, 1, 2 or 3, with an average of from 1.0 to 2.0 and the sum of e+f is not greater than 3, o is 0 or an integer of from 1 to 1,000 and p is an integer of from 1 to 6 is the presence of a catalyst (3) which promotes the addition of Si-bonded hydrogen to an aliphatic double bond, in which the ratio of the aliphatic double bond in the organic compond (1) and the Si-bonded hydrogen in the organopolysiloxane (2) is such that the resultant siloxane copolymers contain an average of more than one alkenyl group per molecule.

5. The process of claim 4, wherein the organic compound (1) is 1,2,4-trivinylcyclohexane.

6. The process of claim 4, wherein the organic compound (1) is 1,5-hexadiene.

7. The process of claim 4, wherein the organopolysiloxane (2) is an organopolysiloxane of the general formula $$H_3R_{3-d}SiO(SiR_2O)_o(SiRHO)_pSiR_{3-d}H_d \quad (VII)$$

in which R is a hydrocarbon radical having from 1 to 18 carbon atoms per radical or a halogenated hydrocarbon radical having from 1 to 18 carbon atoms per radical, d is 0 or 1, o is 0 or an integer of from 1 to 1000 and p is 0 or an integer of from 1 to 6.

8. A process for equilibrating a siloxane copolymer which comprises equilibrating the siloxane copolymer containing alkenyl groups obtained from the process of claim 4 with an organopolysiloxane (4) selected from the group consisting of linear organopolysiloxanes of the formula $HO(SiR_2O)_sH$, cyclic organopolysiloxanes of the formula $(R_2SiO)_t$ and organopolysiloxane copolymers having units of the formulas $R_2SiO$ and $RSiO_{3/2}$, in which R is a hydrocarbon radical having from 1 to 18 carbon atoms per radical or a halogenated hydrocarbon radical having from 1 to 18 carbon atoms per radical, r is 0 or an integer of from 1 to 1500, s is an integer of from 1 to 1500 and t is an integer of from 3 to 12.

9. A crosslinkable composition comprising (a) the siloxane copolymer containing alkenyl groups of claim 1 (b) an organopolysiloxane containing Si-bonded hydrogen atoms and (c) a catalyst which promotes the addition of Si-bonded hydrogen to an aliphatic double bond.

10. The crosslinkable composition of claim 9, which also contains (d) an inhibitor.

11. A non-stick coating which is obtained by crosslinking (a) the siloxane copolymer containing alkenyl groups of claim 1 with (b) an organopolysiloxane containing at least 3 Si-bonded hydrogen atoms per molecule, in which the organopolysiloxane (b) is employed in an amount of from 0.5 to 6 gram atoms of Si-bonded hydrogen per mol of alkenyl group in the siloxane copolymer (a), in the presence of (c) a catalyst which promotes the addition of Si-bonded hydrogen to an aliphatic double bond.

* * * * *

UNITED STATES PATENT AND TRADEMARK OFFICE
CERTIFICATE OF CORRECTION

PATENT NO. : 5,241,034
DATED : August 31, 1993
INVENTOR(S) : Christian Herzig et al.

It is certified that error appears in the above-identified patent and that said Letters Patent is hereby corrected as shown below:

In Claim 4, column 18, line 41, delete "$H_3R_{3-d}SiO(SiR_2O)_o(SIRHO)_p$-$SiR_{3-d}H_3$" and insert in lieu of --- $H_dR_{3-d}SiO(SiR_2O)_o(SiRHO)_pSiR_{3-d}H_d$ ---.

In Claim 7, column 18, line 65, delete "$H_3R_{3-d}SiO(SiR_2O)_oSiRHO)_p$-$SiR_{3-d}H_d$" and insert in lieu of --- $H_dR_{3-d}SiO(SiR_2O)_o(SiRHO)_pSiR_{3-d}H_d$ ---.

In Claim 8, column 19, line 8, after "consisting of" add --- linear organopolysiloxanes of the formula $R_3SiO(SiR_2O)_rSiR_3$, ---.

In Claim 9, column 20, line 1, after "1" insert --- , ---.

Signed and Sealed this

Twenty-fourth Day of May, 1994

Attest:

BRUCE LEHMAN

*Attesting Officer*   Commissioner of Patents and Trademarks

UNITED STATES PATENT AND TRADEMARK OFFICE
CERTIFICATE OF CORRECTION

PATENT NO. : 5,241,034
DATED : August 31, 1993
INVENTOR(S) : Christian Herzig, et al It is certified that error appears in the above-indentified patent and that said Letters Patent is hereby corrected as shown below:

In Claim 4, column 18, line 41, delete "$H_3R_{3-d}SiO(SiR_2O)_o(SiRHO)_p-SiR_{3-d}H_3$" and insert in lieu of — $H_dR_{3-d}SiO(SiR_2O)_o(SiRHO)_pSiR_{3-d}H_d$ —.

In Claim 7, column 18, line 65, delete "$H_3R_{3-d}SiO(SiR_2O)_o SiRHO)_p-SiR_{3-d}H_d$" and insert in lieu of — $H_dR_{3-d}SiO(SiR_2O)_o(SiRHO)_pSiR_{3-d}H_d$ —.

In Claim 8, column 19, line 8, after "consisting of" add — linear organopolysiloxanes of the formula $R_3SiO(SiR_2O)_rSiR_3$, —.

In Claim 9, column 20, line 1, after "1" insert — , —.

Signed and Sealed this

Thirty-first Day of May, 1994

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,241,034
DATED : August 31, 1993
INVENTOR(S) : Christian Herzig, et al It is certified that error appears in the above-indentified patent and that said Letters Patent is hereby corrected as shown below:

In claim 2, column 17, line 61, delete "$-CH_2CHR^3-R^2(CR^3{}'CH_2)_{x-1}$"

should read -- $-CH_2CHR^3-R^2(CR^3=CH_2)_{x-1}$ --

Signed and Sealed this

Ninth Day of August, 1994

Attest:

BRUCE LEHMAN

*Attesting Officer*  *Commissioner of Patents and Trademarks*